Figure 1:
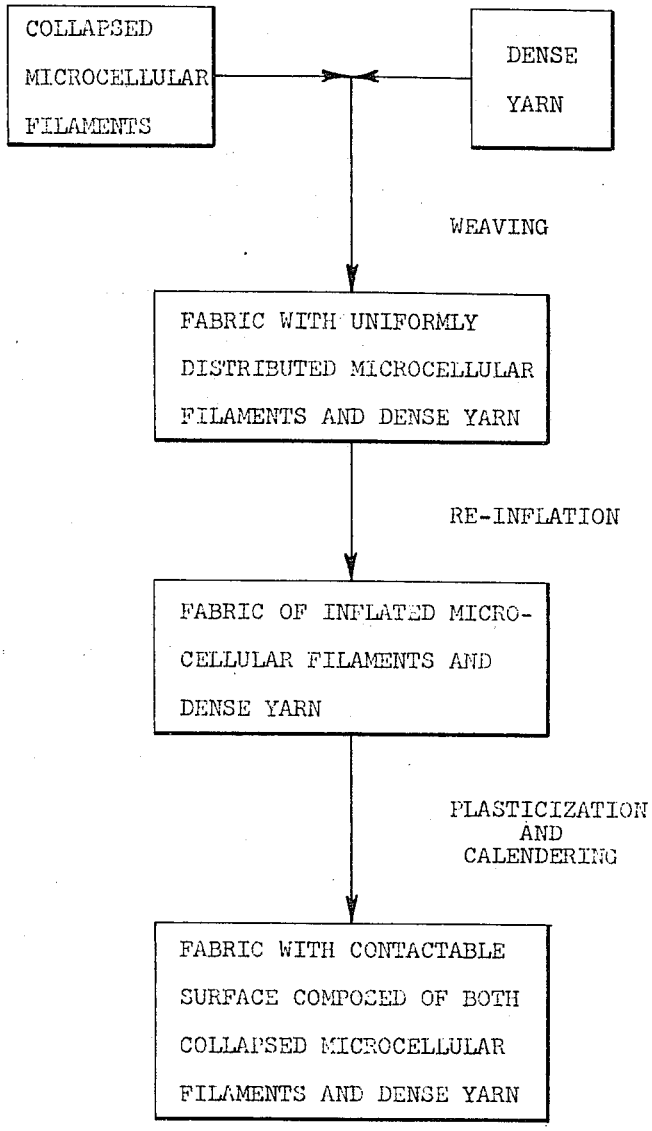
Figure 2:
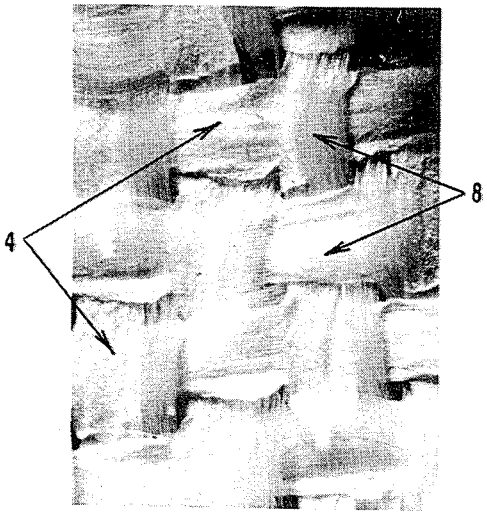
Figure 3:
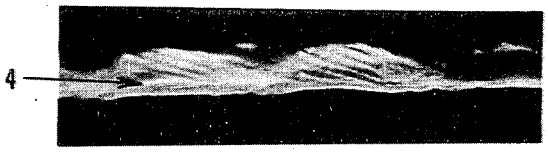
Figure 4:
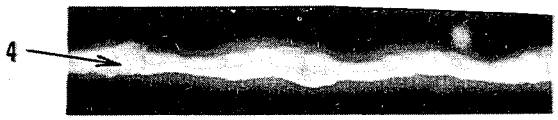
Figure 5:
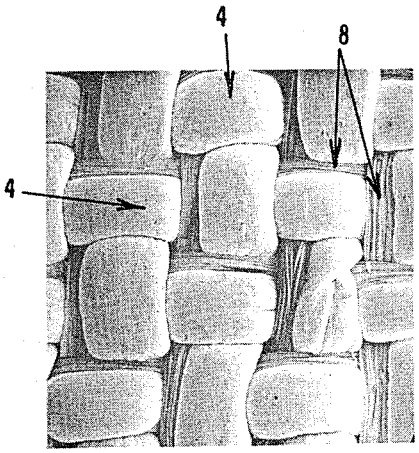
Figure 6:
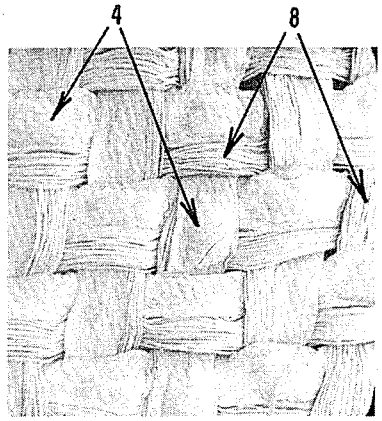
Figure 7:
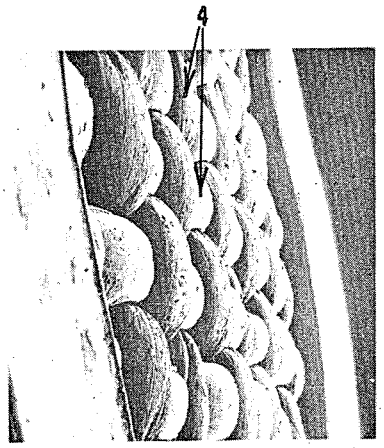
Figure 8:
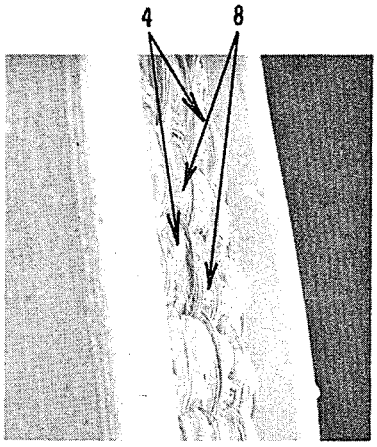
Figure 9:
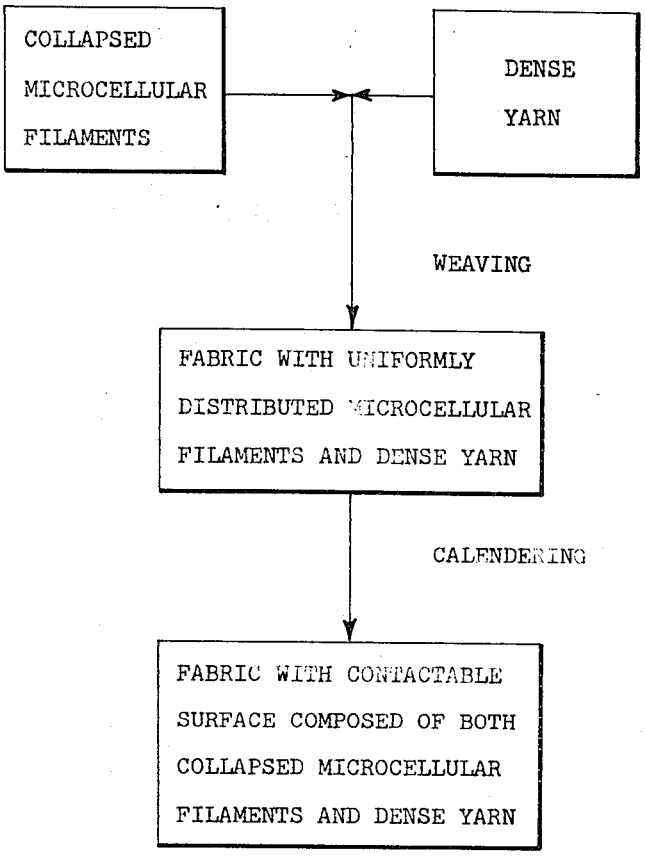
Figure 10:
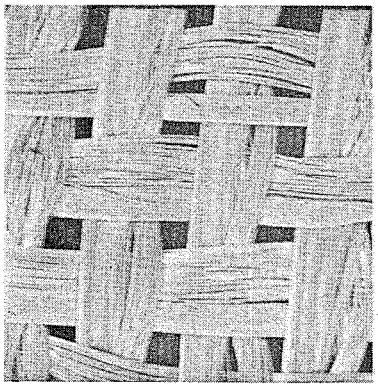
Figure 11:
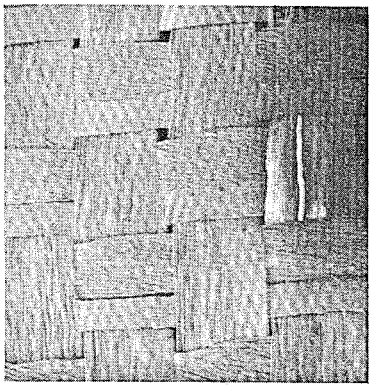
Figure 12:
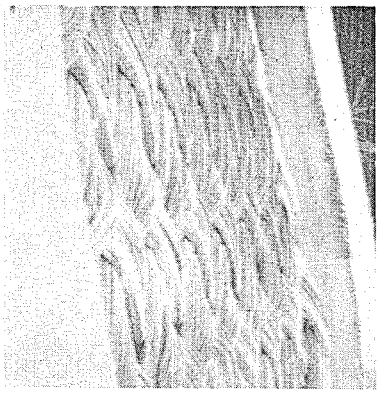
Figure 13:
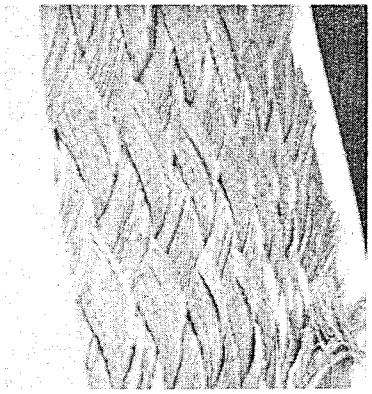

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 12, 1970

874 O.G. 369

T874,001

FABRICS WOVEN FROM MICROCELLULAR FILAMENTS AND METHOD OF PRODUCING SAME

Mary Margaret Schick, Wilmington, Del., assignor to E. I. du Pont de Nemours and Company, Wilmington, Del., a corporation of Delaware

Filed June 23, 1969, Ser. No. 835,475
Int. Cl. D03d *15/00*
U.S. Cl. 161—72
5 Sheets Drawing. 30 Pages Specification

Interweaving collapsed microcellular filaments and dense textile yarns followed by inflation of the microcellular filaments and calendering, forms a fabric characterized in that:

(a) each microcellular filament is, along its whole length, at least 1.1 to 10.0 times as wide in the plane of the fabric as it is thick and exhibits variable thickness along its length such that the ratio of the maximum thickness to the minimum thickness is at least 1.5;
(b) each microcellular filament substantially fills the space between adjacent dense yarns;
(c) The contactable surface of the fabric, as defined by its farthest protruding elements at crossings of strands, is composed of portions of both the microcellular filaments and dense yarns;
(d) the cells of the microcellular filaments have transverse dimensions measured through the free space in the fabric plane at least twice as great as their thickness dimensions.

An example of such fabric comprises 220/50/2Z dense Dacron® polyester yarn and 53 denier ultramicrocellular polyethylene terephthalate filaments. Each ultramicrocellular filament was collapsed on its bobbin to a ribbon-like shape about 0.01″ wide and about 0.0025″ thick. A 2 x 2 basket weave with 60 individual strands per inch in both warp and fill directions was formed. After standard scouring, the finished count was 68 x 66 strands per inch and the fabric weight was 2.4 oz./yd.$^2$ at a thickness of about 0.008 inch.

Such fabrics have at least substantially equivalent strength, opacity, drape and flexibility properties—as compared to known fabrics for comparable uses—at considerably reduced fabric weights.

INVENTOR
MARY MARGARET SCHICK
BY Don M. Kerr
ATTORNEY

INVENTOR
MARY MARGARET SCHICK

BY Don M. Kerr

ATTORNEY

INVENTOR
MARY MARGARET SCHICK

BY Don M. Kerr

ATTORNEY

INVENTOR
MARY MARGARET SCHICK
BY Don M. Kerr
ATTORNEY

INVENTOR
MARY MARGARET SCHICK
BY Dan M. Kerr
ATTORNEY